Patented Oct. 11, 1932

1,881,907

UNITED STATES PATENT OFFICE

ROBERT C. PALMER AND ANTHONY F. OLIVER, OF PENSACOLA, FLORIDA, ASSIGNORS, BY MESNE ASSIGNMENTS, TO NEWPORT INDUSTRIES, INC., A CORPORATION OF DELAWARE

HIGH MELTING-POINT ROSIN AND PROCESS OF PREPARING THE SAME

No Drawing.    Application filed August 27, 1930. Serial No. 478,296.

This invention relates to a process for treating rosin to improve its qualities and to the improved product thus produced. More particularly, this invention is concerned with a process for treating wood rosin to increase its melting point, thereby rendering it more suitable for many technical purposes, such as, the production of molding compositions and molded articles, for the making of sand cores in foundry practice, and for the manufacture of soaps, varnishes, synthetic rosins and the like.

One of the characteristics of wood rosin that has reduced its value in many technical industries is its relatively low melting point as compared to gum rosin. This is particularly true of the "FF" grades of wood rosin which have a melting point of about 52 to 54° C. (by capillary tube method) as compared to an average melting point of 60 to 62° C. for all grades of gum rosin. The purified wood rosins have a higher melting point averaging about 58 to 60° C. for the "M" and "N" grades. This melting point, however, is not high enough to satisfy the requirements for many technical purposes.

Various methods have heretofore been proposed to increase the melting point of wood rosin. One of these methods, for instance, comprises adding lime or caustic alkali to wood rosin whereby part of the rosin is converted into the calcium or the corresponding alkali metal salt (or soap) which has a higher melting point than that of the unsaponified rosin. While the average melting point of the rosin is thus raised, the quality of the resulting product is not greatly improved. The low melting point of rosin may be attributed to the presence therein of certain low-melting constituents. The addition of lime will not saponify these constituents, at least not to any appreciable extent, and therefore, although the average melting point of the rosin is increased the cause of the softness of the rosin remains.

It is accordingly an object of this invention to provide a process for increasing the melting point of wood rosin to a point comparable with that of gum rosin.

It is a further important object of this invention to provide a process for increasing the melting point of wood rosin to a point comparable with that of gum rosin and, at the same time, remove from the rosin those constituents which cause softness of the rosin.

It is a further important object of this invention to provide a process for removing from wood rosin the more volatile constituents of the same to thereby materially raise the melting point of the rosin and improve its quality.

It is a further important object of this invention to provide a wood rosin having a melting point comparable with that of gum rosin, and suitable for uses to which wood rosin is not now normally put.

Other and further important objects of this invention will become apparent from the following description and appended claims.

The U. S. Patent No. 1,643,276 describes a process for improving the quality of wood rosin by subjecting the rosin to a heat treatment at a temperature of from 260 to 300° C., and in some cases as high as 325° C. for a period of time ranging from 8 hours to 2 hours or 1 hour, and in some extreme cases to a period as short as ten minutes. Roughly speaking, the duration of the heat treatment of the rosin in this process is inversely proportional to the temperature employed. We shall hereinafter refer to this heat treatment limited by the temperatures and time elements indicated, as the "solrosing" of rosin, and to the rosin so treated as "solrosed" rosin.

We have found that if wood rosin is subjected to such a "solrosing" treatment followed by a second treatment which removed some of the more volatile constituents of the rosin, the melting point of the rosin residue is considerably raised. This second treatment may consist either of a partial distillation of the rosin by heating the rosin under a vacuum or a partial distillation of the rosin with steam, preferably superheated steam, at a temperature of about 220° C.

According to the first embodiment of our invention, which we will hereinafter refer to as our "vacuum topping" process, wood rosin of grade "FF", for example, having a melting point of from 52 to 54° C. is heated for about one hour at a temperature of 280° C. to effect "solrosing" of the rosin. The "solrosed" rosin is then subjected to a further heating under a fractioning column at an absolute pressure of about 4 mm. of mercury until about 10% of the original weight of the rosin has been removed, whereupon the rosin residue attains a melting point of about 66° C. or an increase of about 14 to 12° C. over the melting point of the original rosin.

In the other embodiment of our invention, wood rosin of grade "FF", for example, is first "solrosed" by heating the rosin to 280° C. for a period of about 4 hours. The "solrosed" rosin is then subjected to a partial distillation with superheated steam at about 220° C. until about 13% of the original rosin has been distilled off. The rosin residue remaining in the still acquires by this treatment a melting point of about 63° C. or an increase of about 11 to 9° C. over the melting point of the original rosin.

In this modification of our process the percentage of rosin distilled off need not be very great, as will be appreciated from the above disclosure, but the greater the percentage distilled off within certain limits, the better will be the qualities of the residual rosin. Thus, by continuing the steam distillation of the rosin under the conditions described above until 16% of the rosin is distilled off the melting point of the residual rosin is raised to 66° C. or an increase of 3° C. by increasing the amount of rosin distillate 3%.

Generally speaking, the results obtained in both embodiments of our invention are similar, but it will be noted that with the "vacuum topping" process, the fraction of rosin removed in order to raise the melting point of the rosin to a certain degree is less than that distilled off in the steam distillation process in raising the melting point of the rosin the same degree. The "vacuum topping" process is, therefore, more effective for most purposes than the steam distillation process.

The reason for this difference between the two processes may be due to the fact that steam distillation at ordinary pressure carries a part of the less volatile constituents of the rosin along with the more highly volatile ones, thereby making it necessary to remove a greater total amount of the rosin before the rosin is rid of the low melting constituents. However, it should be understood that this is merely put forth as a possible theoretical explanation and that we do not intend to limit our invention in any way to such theory.

The beneficial results obtained in the above processes depend to a certain extent upon the intensity of the initial heating or "solrosing" step. Thus, in the above examples of our "vacuum topping" process, the "solrosing" treatment is carried out at approximately 280° C. for a period of one hour with the final result that the melting point of the rosin residue is raised to 66° C. However, if the "solrosing" step of the process is continued for a period of four hours and the "solrosed" rosin then subjected to the vacuum distillation as before until 10% of the original rosin is distilled off, the rosin residue will have a melting point of 71° C. In other words, by carrying out the process under these conditions the melting point of the wood rosin is raised fully 9° higher than the melting point of the best grades of gum rosin.

It may be stated here that according to our observation, the steam distillation or "vacuum topping" step alone, that is, without a preceding "solrosing" treatment, will effect some improvement in the rosin. The results, however, are considerably inferior to those obtained by the combination of the "solrosing" step and one of the distillation steps, especially when dark rosins are treated.

Accordingly, if wood rosin of grade "FF" having a melting point of about 53° C. is treated directly, that is, without a previous "solrosing" step and then heated under a fractioning column at an absolute pressure of 4 mm. of mercury until about 13% of the weight of the rosin is distilled off, the melting point of the residual rosin will be increased to about 61° C.

Again, if a similar sample of wood rosin of grade "FF" is directly treated with superheated steam at a temperature of about 220° C. until about 10% of the original weight of the rosin is distilled off, the residual rosin will have a melting point of about 57° C. Although these distillation steps alone are less efficient than the processes combining the "solrosing" step therewith, they are of some merit in this regard and are included as part of our invention.

In connection with the observations made immediately above, it is interesting to observe further that the "solrosing" treatment per se does not raise the melting point of rosin. It was, therefore, quite surprising to discover that by combining the "solrosing" treatment with the partial distillation step in the order indicated above, a higher melting rosin would be obtained than by subjecting the rosin to a partial distillation only. Evidently, the "solrosing" treatment has an effect on the lower boiling constituents or those constituents responsible for the low melting of wood rosin, whereby, although these constituents are not destroyed or eliminated from the mixture, they are rendered more readily and sharply separable from the other constituents of the rosin. This explanation is, however, not to be construed in any way as a limitation, for it is merely hypothetical on our part. Moreover, it does not in any way alter the fact that by proceeding according to the processes described above, the qualities of rosin are considerably improved.

While we have disclosed our invention as particularly applicable to treating wood rosin of grade "FF", it should be borne in mind that this was done merely to facilitate the description of our process, and lay a basis for comparison and not as a limitation on our invention. Our invention may be applied to any grade of wood rosin and produces, in each case, beneficial results, although, as a general rule, best results, that is, greater increases in the melting point, are obtained with the cruder grades of rosin. Thus, we have shown that when wood rosin of grade "FF" having an initial melting point of 53° C. is "solrosed" at 280° C. for four hours and then subjected to a "vacuum topping" step until 10% of its weight has been removed, the melting point of the residue rises to 71° C. However, when the same procedure is repeated with a sample of wood rosin of grade "N", having an initial melting point of 58° C. the final melting point is found to be only 66°. When the same procedure is applied to pure abietic acid, the melting point remains substantially unchanged.

Our invention, moreover, is not only applicable to all grades of wood rosin, but also may be employed to raise the melting point of gum rosin. In fact, we find that by subjecting gum rosin to a "solrosing step" followed by a partial distillation treatment as described above, the melting point of the rosin for a given percentage of rosin removed in the distillation step is higher than the corresponding rise in the case of wood rosin. Although the melting point of average gum rosin is generally satisfactory for most practical purposes, our invention is of merit in improving the qualities of an occasional inferior sample of gum rosin.

For best results the vacuum employed in the "vacuum topping" step should be as high as possible, and pressures as low as 4 mm. absolute are considered ideal. It is not advisable to use pressure over 18 mm. of mercury absolute, measured in the stills. On the other hand, pressures below 10 mm. of mercury are expensive to maintain on a large scale. The best practical range of pressure for large scale production is, therefore, from 10 to 18 mm. of mercury with a preferred range of from 12 to 15 mm. The temperature corresponding to these pressures varies from 230 to 260° C., but is generally about 260° C. when our preferred pressure range is employed.

The use of a fractioning column in the "vacuum topping" step is not an absolute necessity, as it serves merely to return to the still some of the rosin that may be distilled along with the lower boiling constituents. Its elimination would, therefore, only effect the quantity of the residue and not the quality, provided, of course, that the distillation is carried out long enough to remove the same amount of lower boiling constituents as corresponds to 10% of the initial weight of the rosin.

The temperature employed in the steam distillation step may vary within rather wide limits. For best results we prefer to use superheated steam at a temperature of 220° C. Satisfactory results, however, may be obtained by using temperatures as low as 180° C. or as high as 260° C. Similarly, saturated steam may be used to some advantage.

It will be observed that by our invention above described we have produced a series of novel products in the rosin field. These novel products may be characterized as various grades of wood or gum rosin having higher melting points than the hitherto known corresponding normal grades of wood or gum rosin respectively. Again, while this property is possessed to a certain extent by rosin which has been lime-treated (that is, partially neutralized by means of quicklime or slaked lime), our novel products differ from the latter in being free of calcium salts and containing little of the softer components of rosin. We may, therefore, finally define our novel products as rosins (either gum or wood) of various grades, having a higher melting point than the corresponding normal grade of rosin, being free of calcium salts and containing but little of the low boiling constituents normally found in rosin.

We are aware that various other details of our process may be varied without departing from the principles of our invention, and accordingly, we do not intend to limit ourselves in the patent granted except as necessitated by the prior art.

We claim as our invention:

1. The process of increasing the melting point of rosin, which comprises solrosing the rosin and thereafter partially distilling the solrosed rosin to remove therefrom some of the more highly volatile constituents.

2. The process of increasing the melting point of wood rosin, which comprises subjecting the same to a preliminary heat treatment at a temperature of about 260 to 300° C. for a period of from 8 to 1 hours, and thereafter partially distilling the rosin to remove therefrom some of its more highly volatile constituents.

3. The process of increasing the melting point of wood rosin, which comprises subjecting the same to a preliminary heat treatment at a temperature of about 260 to 300° C. for a period of about 8 to 1 hours and thereafter partially distilling the rosin to remove a fraction not exceeding 16% of the original weight of the rosin.

4. The process of increasing the melting point of wood rosin which comprises subjecting the same to a preliminary heat treatment at a temperature of about 260 to 300° C. for a period of about 8 to 1 hours, and thereafter partially distilling the rosin to remove a fraction amounting to form 10 to 16% of the original weight of the rosin.

5. The process of increasing the melting point of wood rosin which comprises subjecting the same to a preliminary heat treatment at a temperature of about 260 to 300° C. for a period of about 8 to 1 hours, and thereafter subjecting the rosin to a partial distillation under a high vacuum, whereby to remove some of the more highly volatile constituents of the rosin.

6. The process of increasing the melting point of wood rosin which comprises subjecting the rosin to a preliminary heat treatment at a temperature of about 260 to 300° C. for a period of about 8 to 1 hours and thereafter subjecting the rosin to a partial distillation under a high vacuum until about 10% of its weight has been removed.

7. The process of increasing the melting point of wood rosin which comprises heating the same at about 280° C. for a period of about 1 to 4 hours and then subjecting the rosin to a partial distillation under a high vacuum until substantially 10% of its weight has been removed.

8. The process of increasing the melting point of wood rosin which comprises heating the same at about 280° C. for a period of about 1 to 4 hours and then subjecting the rosin to a partial distillation at an absolute pressure of from 10 to 18 mm. of mercury until about 10% of its weight has been removed.

9. The process of increasing the melting point of wood rosin, which comprises heating the rosin at about 280° C. for a period of about 1 to 4 hours, and then subjecting the rosin to a partial distillation at an absolute pressure of about 12 to 15 mm. of mercury until a substantial portion of the rosin has been removed.

10. The process of increasing the melting point of wood rosin, which comprises heating the same at about 280° C. for a period of about 1 to 4 hours and then subjecting the rosin to a partial distillation at an absolute pressure of about 12 mm. of mercury until about 10% of its weight has been removed.

11. The process of increasing the melting point of wood rosin which comprises solrosing the rosin and thereafter subjecting the solrosed rosin to a partial distillation with steam, whereby to remove some of the more highly volatile constituents of the rosin.

12. The process of increasing the melting point of wood rosin, which comprises subjecting the same to a preliminary heat treatment at a temperature of about 260 to 300° C. for a period of about 8 to 1 hours and thereafter subjecting the rosin to a partial distillation with superheated steam, whereby to remove some of the more highly volatile constituents of the rosin.

13. The process of increasing the melting point of wood rosin, which comprises subjecting the rosin to a preliminary heat treatment at a temperature of about 260 to 300° C. for a period of about 8 to 1 hours, and thereafter subjecting the rosin to a partial distillation with superheated steam at a temperature of about 180 to 260° C., whereby to remove some of the more highly volatile constituents of the rosin.

14. The process of increasing the melting point of wood rosin, which comprises subjecting the rosin to a preliminary heat treatment at a temperature of about 260 to 300° C. for a period of about 8 to 1 hours, and thereafter subjecting the rosin to partial distillation with superheated steam at a temperature of about 180 to 260° C. until from about 10 to 16% of the original weight of the rosin has been removed.

15. The process of increasing the melting point of wood rosin, which comprises subjecting the rosin to a preliminary heat treatment at a temperature of about 260 to 300° C. for a period of about 8 to 1 hours, and thereafter subjecting the rosin to a partial distillation with superheated steam at a temperature of about 220° C. until about 13 to 16% of the weight of the rosin has been removed.

16. As a new product of manufacture a solrosed wood rosin having a melting point between 60 and 71° C.

17. As a new product of manufacture a solrosed wood rosin having a melting point of between 63 and 71° C. and being free of calcium salts.

18. A solrosed "FF" grade wood rosin having a melting point of about 66° C.

In testimony whereof, we have hereunto subscribed our names at Pensacola, Escambia County, Florida.

ROBERT C. PALMER.
ANTHONY F. OLIVER.